(12) United States Patent
Yokota et al.

(10) Patent No.: US 9,458,865 B2
(45) Date of Patent: *Oct. 4, 2016

(54) CYLINDER DEVICE WITH FORCE MULTIPLIER

(75) Inventors: Hideaki Yokota, Hyogo (JP); Keitaro Yonezawa, Hyogo (JP)

(73) Assignee: KOSMEK LTD. (JP)

( * ) Notice: Subject to any disclaimer, the term of this patent is extended or adjusted under 35 U.S.C. 154(b) by 368 days.

This patent is subject to a terminal disclaimer.

(21) Appl. No.: 14/128,054

(22) PCT Filed: May 16, 2012

(86) PCT No.: PCT/JP2012/003214
§ 371 (c)(1),
(2), (4) Date: Dec. 20, 2013

(87) PCT Pub. No.: WO2013/031061
PCT Pub. Date: Mar. 7, 2013

(65) Prior Publication Data
US 2014/0109759 A1    Apr. 24, 2014

(30) Foreign Application Priority Data
Aug. 26, 2011  (JP) .................. 2011-199971

(51) Int. Cl.
*F15B 15/16*  (2006.01)
*F15B 15/26*  (2006.01)
(Continued)

(52) U.S. Cl.
CPC .............. *F15B 15/16* (2013.01); *B25B 5/061* (2013.01); *B25B 5/062* (2013.01); *B25B 5/064* (2013.01);
(Continued)

(58) Field of Classification Search
CPC ......... F15B 15/261; F15B 15/16; B25B 5/06
USPC .......... 269/32, 309, 38; 92/20, 22; 91/167 R
See application file for complete search history.

(56) References Cited

U.S. PATENT DOCUMENTS 4,742,758 A * 5/1988 Della Rocca ......... F15B 15/261
91/43
4,881,745 A    11/1989 Peters
(Continued)

FOREIGN PATENT DOCUMENTS

EP    1595640 A1    11/2005
JP    1171903       12/1989
(Continued)

OTHER PUBLICATIONS

JP,2009-255219 ("Selected Gazette", Detailed Description, English computer translation by J-Plat Pat. retrived on Feb. 29, 2016 from <URL: https://www4.j-platpat.inpit.go.jp>).*
(Continued)

*Primary Examiner* — F. Daniel Lopez
*Assistant Examiner* — Richard Drake
(74) *Attorney, Agent, or Firm* — Bacon & Thomas, PLLC (57) ABSTRACT

A first piston (10) is inserted in a housing (2) so as to be hermetically movable vertically. A second piston (20) is inserted in a cylindrical hole (14) of the first piston (10) so as to be hermetically movable axially, and has an output rod (26) projecting upward from the housing (2). A lock chamber (40) is formed below the first piston (10) and the second piston (20), and a release chamber (42) is formed above the first piston (10) and the second piston (20). A force multiplier (52) is arranged in the housing (2) so as to cause (i) a first force, with which a pressurized fluid supplied into the lock chamber (40) pushes the first piston (10) upward, to be transformed in a force-multiplying manner into a second force and (ii) the second force to be transmitted to the second piston (20). Further, a change-over mechanism (54) is arranged in the housing (2) so as to selectively couple the first piston (10) to the housing (2) or the second piston (20).

11 Claims, 7 Drawing Sheets

(51) Int. Cl.
*B25B 5/06* (2006.01)
*B25B 5/12* (2006.01)
*B25B 5/16* (2006.01)
*F15B 3/00* (2006.01)
*F15B 15/20* (2006.01)
*F15B 15/14* (2006.01)

(52) U.S. Cl.
CPC ............... *B25B 5/122* (2013.01); *B25B 5/16* (2013.01); *F15B 3/00* (2013.01); *F15B 15/1409* (2013.01); *F15B 15/204* (2013.01); *F15B 15/26* (2013.01)

(56) References Cited

U.S. PATENT DOCUMENTS

| 4,932,640 | A | * | 6/1990 | Shirakawa | B23Q 1/28 269/32 |
|---|---|---|---|---|---|
| 6,394,437 | B1 | | 5/2002 | Yonezawa | |
| 7,175,169 | B2 | * | 2/2007 | Yonezawa | B25B 5/06 269/228 |
| 9,133,866 | B2 | * | 9/2015 | Yokota | B25B 5/064 |
| 9,188,141 | B2 | * | 11/2015 | Yokota | B25B 5/064 |

FOREIGN PATENT DOCUMENTS

| JP | 6300008 | | 10/1994 |
|---|---|---|---|
| JP | 11166506 | | 6/1999 |
| JP | 11170133 | | 6/1999 |
| JP | 11245130 | | 9/1999 |
| JP | 200125932 | A | 1/2001 |
| JP | 2007268625 | A | 10/2007 |
| JP | 2007568625 | | 10/2007 |
| JP | 2009255219 | | 11/2009 |
| JP | 2009255219 | A * | 11/2009 |

OTHER PUBLICATIONS

European Search Report for 12827665.6 dated Sep. 4, 2015.
English Language Translation of International Preliminary Report on Patentability dated Mar. 4, 2014.
English Language Translation of International Search Report for PCT/JP2012/003214 dated Jun. 12, 2012.
English language translation of International Search Report for PCT/JP2011/006114 dated May 24, 2013.
English language translation of International Preliminary Report on patentability dated May 24, 2013.
Japanese Office Action of JP2010-277451 (5-1: Notification of reasons for refusal 5-2: Decision to Grant a Patent) dated Dec. 5, 2011 and Feb. 23, 2012.
Japanese Office Action of JP2012-028741 (6-1: Decision to Grant a Patent) dated Jun. 15, 2012.
Japanese Office Action of JP2012-028741 (7-1: Notification of reasons for refusal 7-2: Decision to Grant a Patent) dated Jun. 15, 2011 and Oct. 1, 2012.
Japanese Office Action of JP2012-028742 (7-1P Notification of reasons for refusal 7-2: Decision to Grant a Patent) dated Jun. 15, 2011 and Oct. 1, 2012.
International Search Report for PCT/JP2012/003214 dated Jun. 12, 2012.

* cited by examiner

CYLINDER DEVICE WITH FORCE MULTIPLIER

TECHNICAL FIELD

The present invention relates to a cylinder device provided with a force multiplier and, more specifically, to a technology for, in fixing an object to be fixed such as a workpiece or a die, first rapidly driving an output rod provided in the cylinder device and then driving the output rod in a force-multiplying manner.

BACKGROUND ART

Such a type of conventional cylinder device with a force multiplier is disclosed in Patent Literature 1 (Japanese Patent Application Publication, Tokukai, No. 2007-268625 A). The conventional technology is configured as follows:

A clamping rod serving as an output rod is inserted in a housing so as to be movable vertically. A first piston for force multiplication is inserted in a lower part of the housing, and is fitted on the clamping rod so as to be movable vertically. A first lock chamber and a first release chamber are formed above and below the first piston, respectively. A second piston for rod is inserted in an upper part of the housing, and is fixed to the clamping rod. A second lock chamber and a second release chamber are formed above and below the second piston, respectively.

In a case where the clamping rod is subjected to lock driving, the first piston and the second piston are driven downward by supplying compressed air into the first lock chamber and the second lock chamber. This first causes the second piston to drive the clamping rod downward during a low-load stroke of the lock driving, and then causes the first piston to drive the clamping rod downward in a force-multiplying manner via a force multiplier during a high-load stroke that follows the low-load stroke.

CITATION LIST

Patent Literature 1

Japanese Patent Application Publication, Tokukai, No. 2007-268625 A

SUMMARY OF INVENTION

Technical Problem

In the conventional technology, the first piston and the second piston are arranged in tandem with each other vertically. Such a housing is tall and results in a bulky cylinder device.

Further, the conventional technology requires compartmentalization of the first lock chamber formed above the first piston and the second release chamber formed below the second piston, thus requiring a thick partition wall to be provided at a certain height of the housing. Such a housing is even taller and results in an even bulkier cylinder device.

It is an object of the present invention to provide a small-sized cylinder device with a force multiplier.

Solution to Problem

In order to attain the foregoing object, a cylinder device with a force multiplier of the present invention is configured as described below, for example, as shown in each of FIGS. 1 through 3, 4, 5, 6A through 6D, and 7.

A first piston 10 is inserted in a housing 2 so as to be hermetically movable axially. The first piston 10 has a cylindrical hole 14 bored therethrough axially. A second piston 20 is inserted in the cylindrical hole 14 of the first piston 10 so as to be hermetically movable axially. The second piston 20 has an output rod 26 projecting outward from the housing 2. A lock chamber 40 and a release chamber 42 are formed by using the first piston 10 and the second piston 20 to axially compartmentalize space in the housing 2. A pressurized fluid is supplied and discharged into and out of the lock chamber 40 and the release chamber 42. A force multiplier 52 is arranged which causes (i) a first force, with which a pressurized fluid supplied into the lock chamber 40 pushes the first piston 10 toward the release chamber 42, to be transformed in a force-multiplying manner into a second force and (ii) the second force to be transmitted to the second piston 20. Further, a change-over mechanism 54 is arranged which selectively couples the first piston 10 to the housing 2 or the second piston 20. The change-over mechanism 54 receivably couples the first piston 10 to the housing 2 during a low-load stroke of the second piston 20 and drivably couples the first piston 10 to the second piston 20 via the force multiplier 52 during a high-load stroke of the second piston 20.

The present invention brings about the following effects:

In the present invention, the parallel arrangement of the first and second pistons by the insertion of the second piston in the cylindrical hole bored through the first piston makes it possible to drastically reduce the height of the housing to make the cylinder device compact, unlike in the case of the aforementioned conventional technology in which two pistons are arranged in tandem with each other.

Further, since the lock chamber and the release chamber are formed on both end sides of the first and second pistons, respectively, the present invention does not require a thick partition wall to be provided at a certain height of the housing, unlike in the case of the conventional technology. Such a housing is short and results in an even smaller cylinder device.

The change-over mechanism 54 of the present invention is preferably configured as described below, for example, as shown in each of FIGS. 1 through 3, 5, and 6A through 6D.

That is, when the second piston 20 has advanced toward the release chamber 42 by a predetermined low-load stroke with the first piston 10 receivably coupled to the housing 2, the change-over mechanism 54 decouples the first piston 10 from the housing 2 and drivably couples the first piston 10 to the second piston 20 via the force multiplier 52.

Further, the present invention preferably further include the following configuration, for example, as shown in each of FIGS. 1 through 3, 5, and 6A through 6D.

The housing 2 has two end walls 2a and 2b and a guide cylinder 6 projecting from one of the two end walls 2a (or 2b) toward the other end wall 2b (or 2a), and the second piston 20 has a guide face 32 formed on an outer circumference thereof and inserted in the guide cylinder 6. The force multiplier 52 includes: supporting holes 56 formed in a cylindrical wall 6a of the guide cylinder 6 at predetermined intervals circumferentially and bored through the cylindrical wall 6a radially; engaging balls 58 put in the supporting holes 56, respectively; cam faces 62 formed on the outer circumference of the second piston 20 so that the engaging balls 58 engage with the cam faces 62, respectively, each of the cam faces 62 being formed to get closer to an axis of the second piston 20 as it extends toward the lock chamber 40;

and a force-multiplying face 64 formed in the cylindrical hole 14 of the first piston 10 and formed to get closer to the axis as it extends toward the lock chamber 40.

This brings about an effect of making it possible to make the force multiplier simple and compact.

Further, the present invention preferably further include the following configuration, for example, as shown in each of FIGS. 1 through 3, 5, and 6A through 6D.

The first piston 10 is provided with a press portion 66 for pushing the engaging balls 58 radially inward at a start of force multiplication driving of the force multiplier 52, and for, during the low-load stroke of the second piston 20, pushing the engaging balls 58 radially inward and toward the guide face 32 of the second piston 20.

In the foregoing configuration, it is preferable that the press portion 66 be formed such that a force with which the press portion 66 pushes the engaging balls 58 radially inward is smaller than a force with which the force-multiplying face 64 pushes the engaging balls 58 radially inward. In this case, the force with which the press portion presses the engaging balls against the second piston can be set at a small value. This reduces the force of friction that acts on the second piston, thus allowing the second piston to smoothly move.

Furthermore, the change-over mechanism 54 of the present invention is preferably configured as described below, for example, as shown in each of FIGS. 1 through 3, 5, and 6A through 6D.

The change-over mechanism 54 is constituted by the press portion 66, the engaging balls 58, the guide face 32, and the cam faces 62. The change-over mechanism 54 is configured such that during the low-load stroke, the engaging balls 58, pushed out radially outward by the guide face 32, receive the press portion 66 on a side of the release chamber 42, whereby the second piston 20 moves up toward the release chamber 42, leaving behind the first piston 10. Further, the change-over mechanism 54 is configured such that at the start of the force multiplication driving, the press portion 66 causes the engaging balls 58 to engage with the cam faces 62, respectively, whereby the force-multiplying face 64 of the first piston 10 drives the second piston 20 via the engaging balls 58 and the cam faces 62.

In this case, some of the components of the force multiplier can be utilized as components of the change-over mechanism. This makes it possible to make the cylinder device simple and more compact.

Figure 1:
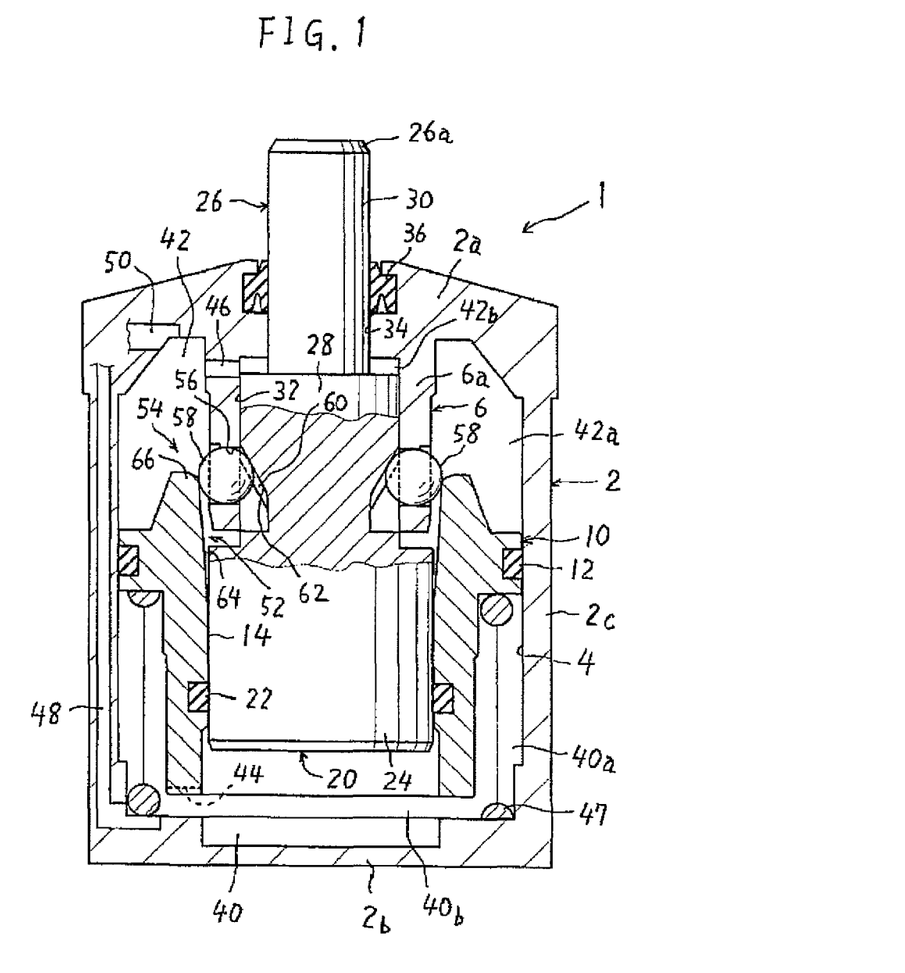
FIG. 1, which is equivalent to FIG. 2C, is an elevational cross-sectional view of a cylinder device with a force multiplier according to a first embodiment of the present invention.
Figure 2A:
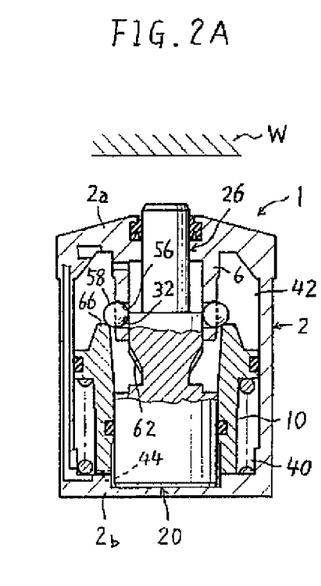
FIGS. 2A through 2D are diagrams for explaining how the cylinder device operates.
Figure 2B:
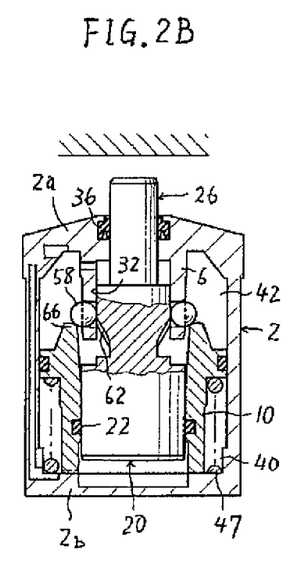
Figure 2C:
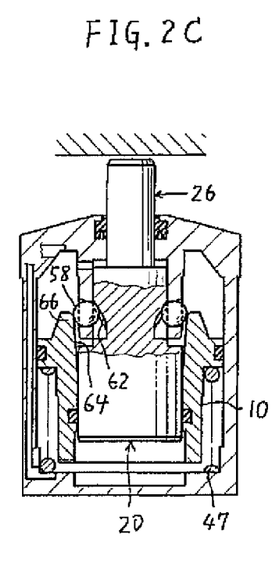
Figure 2D:
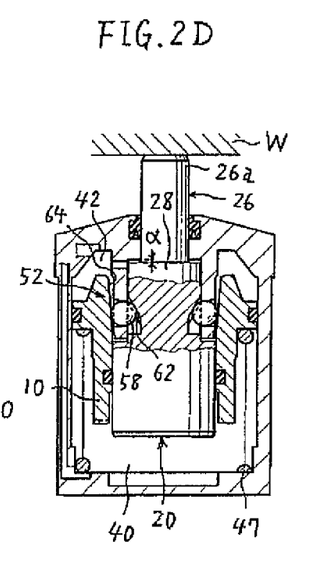
Figure 3:
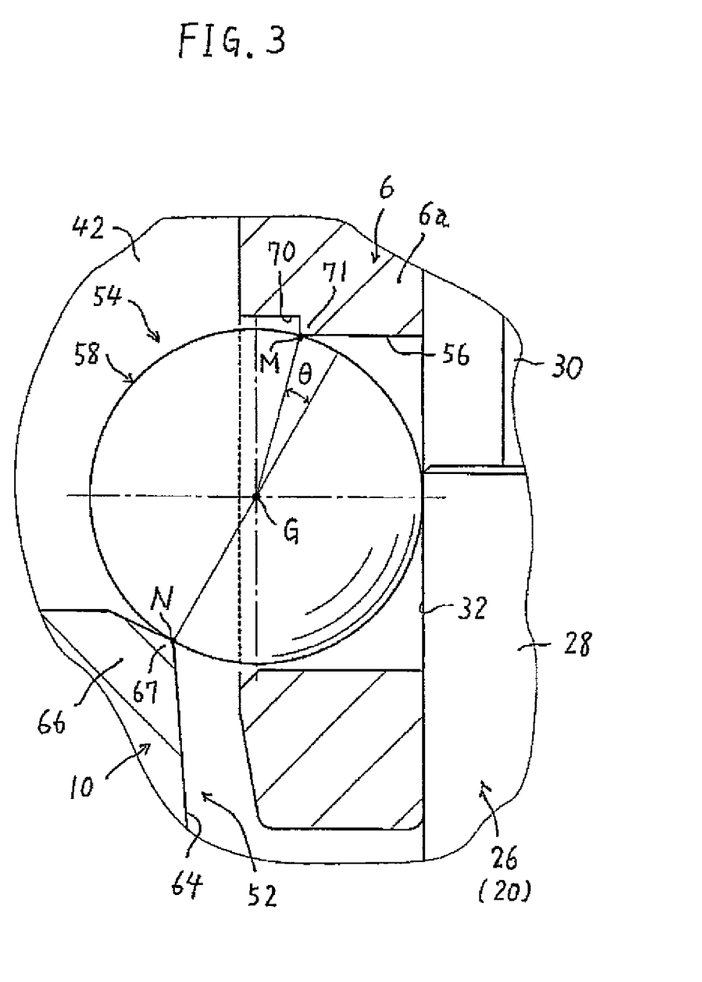
FIG. 3 is an enlarged view of a main part of FIG. 2A.

In the present invention, it is preferable, as shown in FIGS. 1 through 3 for example, that a pressure-receiving area of the piston main body 24 of the second piston 20 take on a greater value than a pressure-receiving area of the output rod 26.

In this case, the second piston can be smoothly release-driven.

Further, in the present invention, it is preferable, as shown in FIGS. 1 through 3 for example, that an outer diameter of the piston main body 24 of the second piston 20 take on a greater value than an inner diameter of the guide cylinder 6.

In this case, the second piston can be strongly lock-driven.

In the present invention, as shown in FIGS. 1 through 3 for example, the output rod 26 may project outward from the housing 2 and toward the release chamber 42.

Further, in the present invention, as shown in FIGS. 6A through 6D for example, the output rod 26 may project outward from the housing 2 and toward the lock chamber 40.

Figure 4:
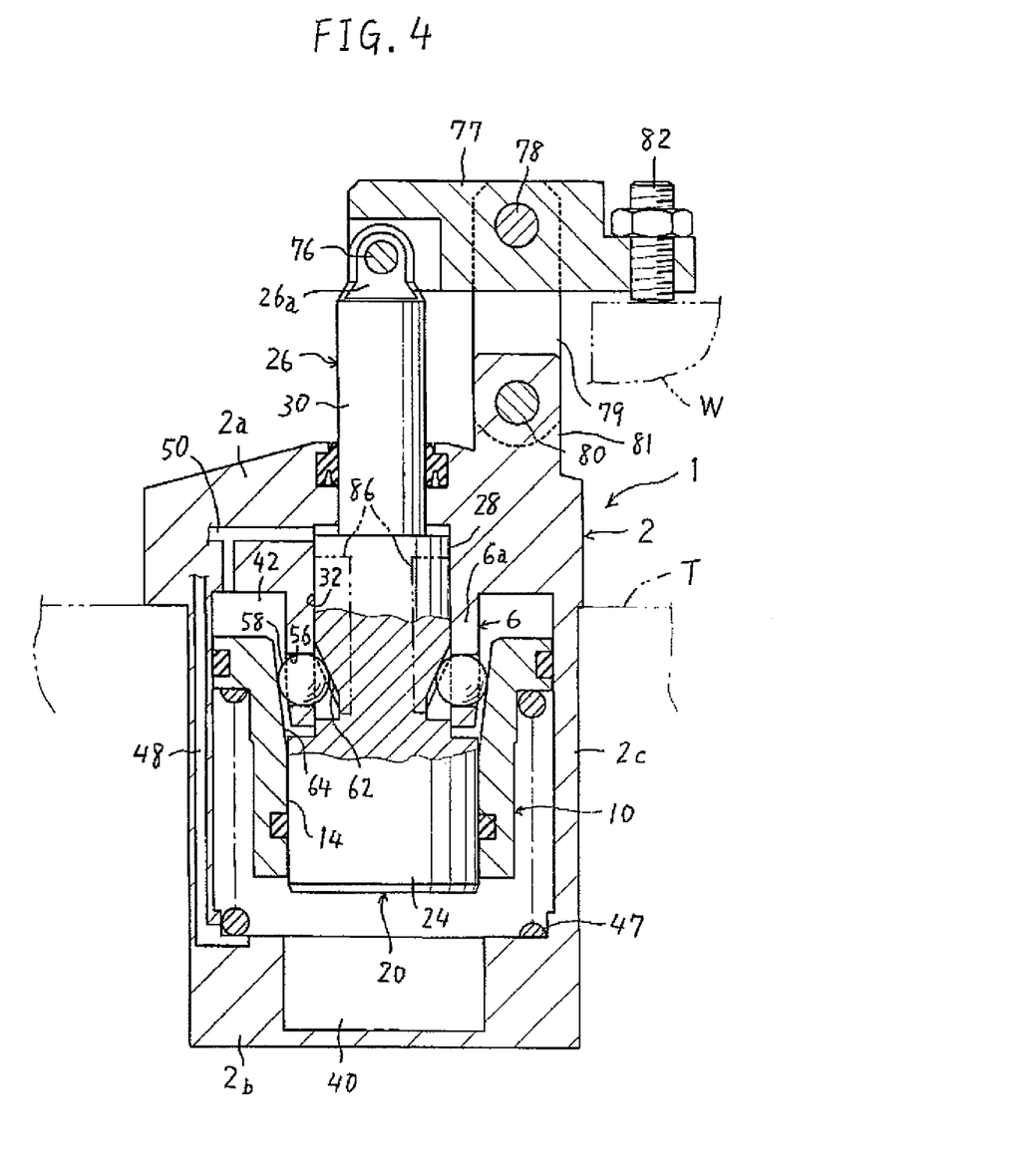
FIG. 4, which is similar to FIG. 2D, shows a cylinder device according to a second embodiment of the present invention.

In the present invention, it is preferable, as shown in FIG. 4 for example, that the cylinder device 1 further include a cam member 86 mounted in an outer circumferential part of the output rod 26, the cam member 86 being provided with the guide face 32 and the cam faces 62.

In this case, it is only necessary to treat only the cam member in hardening the cam faces and the guide face, and it is no longer necessary to treat the whole second piston.

Furthermore, in the present invention, it is preferable, as shown in FIG. 4 for example, that the cam member 86 is mounted on the output rod 26 so as to be rotatable around the axis and the cam member 86 is coupled to the guide cylinder 6 so as to be movable axially and irrotatable around the axis.

This allows the output rod (and the second piston) to freely rotate around its axis with respect to the housing and the cam member. Therefore, even in a case where the output rod (and the second piston) receives excessive torque from any cause, the cam member can be prevented from rotating. This makes it possible to prevent damage to the cam faces and the guide face of the cam member.

DESCRIPTION OF EMBODIMENTS

FIGS. 1 through 3 show a first embodiment of the present invention. First, a structure of a cylinder device 1 with a force multiplier is described with reference to FIG. 1.

The cylinder device 1 has a housing 2, and the housing 2 includes an upper end wall 2a, a lower end wall 2b, and a barrel part 2c. The housing 2 is fixed to a stationary member such as a work pallet with a plurality of bolts (neither of which is illustrated).

The housing 2 has a cylinder hole 4 formed therein so that the cylinder hole 4 extends vertically (axially), and has a guide cylinder 6 integrally projecting downward from the upper end wall 2a in the cylinder hole 4.

A first piston 10 for force multiplication is inserted in the cylinder hole 4 via an outer sealing member 12 so as to be hermetically movable vertically. The first piston 10 has a cylindrical hole 14 bored therethrough vertically, with a second piston 20 inserted in the cylindrical hole 14 so as to be movable vertically.

The second piston 20 includes: a piston main body 24, which is hermetically inserted in the cylindrical hole 14 via an inner sealing member 22; and an output rod 26, which integrally projects upward from the piston main body 24. The output rod 26 has a large-diameter portion 28 and a small-diameter portion 30.

The output rod 26 has a guide face 32 provided on the outer circumference of the large-diameter portion 28 and inserted in a cylindrical hole of the guide cylinder 6. An outer diameter of the piston main body 24 takes on a greater value than an inner diameter of the guide cylinder 6. Further, the small-diameter portion 30 projects toward a higher position than the upper end wall 2a, and is hermetically inserted in a through-hole 34 of the upper end wall 2a via an upper sealing member 36. The upper sealing member 36 also functions as a scraper.

The small-diameter portion 30 has its upper part constituted as an output portion 26a of the output rod 26.

Between a cylindrical wall 6a of the guide cylinder 6 and the output rod 26, straight guide means (not illustrated) is provided. The straight guide means functions to both guide the second piston 20 straight vertically and prevent the second piston 20 from rotating on its axis.

The first piston 10 and the second piston 20 compartmentalize the space in the housing 2 into two chambers, namely a lock chamber 40 and a release chamber 42 located above the lock chamber 40.

The lock chamber 40 includes a first lock chamber 40a located below the first piston 10 and a second lock chamber 40b located below the second piston 20. These two lock chambers 40a and 40b can be communicated with each other via a transverse groove 44 formed in a lower end face of the first piston 10 (see FIG. 2A).

The release chamber 42 includes a first release chamber 42a located above the first piston 10 and a second release chamber 42b located above the large-diameter portion 28 of the output rod 26. These two release chambers 42a and 42b are communicated with each other via a transverse hole 46 formed in an upper part of the cylindrical wall 6a of the guide cylinder 6.

The first lock chamber 40a is mounted with a retaining spring 47, and the retaining spring 47 biases the first piston upward. Further, in the second piston 20, a pressure-receiving area of the piston main body 24 takes on a greater value than a pressure-receiving area of the small-diameter portion 30 of the output rod 26.

Compressed air serving as a pressurized fluid is supplied into and discharged out of the lock chamber 40 and the release chamber 42. That is, the lock chamber 40 communicates with a lock port (not illustrated) via a supply and discharge passage 48 of compressed air for locking. Further, the release chamber 42 communicates with a release port (not illustrated) via a supply and discharge passage 50 of compressed air for releasing.

In the release chamber 42, a force multiplier 52 and a change-over mechanism 54 are arranged. The force multiplier 52 is configured to cause (i) a first force, with which compressed air supplied into the lock chamber 40 pushes the first piston 10 upward (toward the release chamber 42), to be transformed in a force-multiplying manner into a second force and (ii) the second force to be transmitted to the second piston 20. Further, the change-over mechanism 54 is configured to selectively couple the first piston 10 to the housing 2 or the second piston 20. The force multiplier 52 and the change-over mechanism 54 are described in detail below.

The force multiplier 52 is configured as follows:

The guide cylinder 6 has four supporting holes 56 formed in a lower part of the cylindrical wall 6a at predetermined intervals circumferentially and bored through the cylindrical wall 6a radially, with engaging balls 58 put in the supporting holes 56, respectively. The output rod 26 has cam grooves 60 formed on the outer circumference of the large-diameter portion 28 so as correspond to the engaging balls 58, respectively. Each of the cam groove 60 has a cam face 62 formed on a bottom wall thereof. The cam face 62 is formed to get closer to an axis of the second piston 20 as it extends downward. In other words, the cam face 62 is formed to become smaller in diameter as it extends toward the lock chamber 40 located therebelow. The engaging balls 58 can engage with the cam faces 62, respectively.

Further, the first piston 10 has a force-multiplying face 64 formed in an upper-half part of the cylindrical hole 14. The force-multiplying face 64 is a tapered surface formed to get closer to the axis as it extends downward (toward the lock chamber 40).

Furthermore, the first piston 10 has a press portion 66 provided as an upper portion thereof so as to push the engaging balls 58 radially inward at the start of force multiplication driving. During a low-load stroke of the second piston 20, the press portion 66 functions to push out the engaging balls 58 radially inward, i.e., toward the guide face 32 of the output rod 26. Further, the press portion 66 is formed such that a force with which the press portion 66 pushes the engaging balls 58 radially inward is smaller than a force with which the force-multiplying face 64 pushes the engaging balls 58 radially inward.

The change-over mechanism 54 is configured to couple the first piston 10 to the housing 2 during a low-load stroke of the second piston 20 and couple the first piston 10 to the second piston 20 via the force multiplier 52 during a high-load stroke of the second piston 20. In this embodiment, the change-over mechanism 54 is constituted by the press portion 66, the engaging balls 58, the guide face 32, and the cam faces 62.

As shown in FIGS. 2A through 2D and 3, the cylinder device 1 thus configured operates as described below. Note that FIG. 3 is an enlarged view of the change-over mechanism 54 in FIG. 2A.

In the release state shown in FIG. 2A, compressed air is discharged out of the lock chamber 40, and compressed air is supplied into the release chamber 42. This causes the compressed air in the release chamber 42 to move down the first piston 10 and causes the second piston 20 to move down.

In the release state, a workpiece (object to be pressed) W is brought in above the housing 2.

In a case where the cylinder device 1 is subjected to lock driving, (i) the compressed air is discharged out of the release chamber 42 and (ii) compressed air is supplied into the lock chamber 40, in the release state shown in FIG. 2A. In this state, the guide face 32 of the output rod 26 pushes out the engaging balls 58 radially outward. This causes the press portion 66 of the first piston 10 to be received by upper walls of the supporting holes 56 of the guide cylinder 6 via the engaging balls 58 (i.e., causes the first piston 10 to be coupled to the guide cylinder 6). This prevents the first piston 10 from moving up.

This causes, as shown in FIG. 2B (a final stage of a low-load stroke), the second piston 20 to move up with a low load, leaving behind the first piston 10.

More specifically, a resultant of the pressure of the compressed air in the lock chamber 40 and the biasing force of the retaining spring 47 acts upward on the first piston 10 so that the press portion 66 pushes the engaging balls 58 toward the guide face 32 of the output rod 26 with a force that serves as sliding resistance to the second piston 20. Furthermore, the second piston 20 also receives sliding resistance from the inner sealing member 22 and the upper sealing member 36. Therefore, the second piston 20 moves up against the sliding resistance.

At a termination stage of the moving up with the low-load stroke as shown in 2B, the engaging balls 58 are about to engage with the cam faces 62.

When the second piston 20 moves up with a predetermined stroke, the press portion 66 pushes out the engaging balls 58 toward the cam face 62 as shown in FIG. 2C (initial state of force multiplication driving). It is now possible to start force multiplication driving. This causes the first piston 10 to be decoupled from the guide cylinder 6 (housing 2), and the force-multiplying face 64 of the first piston 10 starts to strongly push up the second piston 20 via the engaging balls 58 and the cam faces 62. In this case, since the biasing force of the retaining spring 47 also acts on the second piston 20 via the first piston 10, the second piston 20 further strongly moves up.

Then, in a locked state shown in FIG. 2D, the first piston 10 and the second piston 20 slightly move up so that the output portion 26a of the output rod 26 makes contact with the workpiece W, with the result that the workpiece W is pressed. In the locked stated shown in FIG. 2D, there is a margin stroke α left above the large-diameter portion 28 of the output rod 26.

In the locked state, a resultant of a force acting from the first piston 10 on the second piston 20 via the force multiplier 52 and a pneumatic pressure acting on the second piston 20 acts upward, so that the output rod 26 strongly presses the workpiece W. Even in a case where there is a decrease or loss in pressure of the lock chamber 40 from any cause, the biasing force of the retaining spring 47 mechanically retains the locked state via the wedge function of the force multiplier 52 (force-multiplying face 64, engaging balls 58, cam faces 62, etc.), so that the locked state is surely maintained.

In a case where the cylinder device 1 is changed from the locked state shown in FIG. 2D to the release state shown in FIG. 2A, (i) the compressed air is discharged out of the lock chamber 40 and (ii) compressed air is supplied into the release chamber 42, in the locked state shown in FIG. 2D. This causes the first piston 10 and the second piston 20 to move down.

This causes, as shown in FIG. 2C, the cam faces 62 of the output rod 26 to start press the engaging balls 58 radially outward. Then, as shown in FIG. 2B, the first piston 10 is prevented by the lower end wall 2b from moving down and, at substantially the same time, the guide face 32 of the output rod 26 pushes out the engaging balls 58 radially outward. This causes the first piston 10 to be decoupled from the second piston 20, and the first piston 10 becomes able to be received by the guide cylinder 6 via the engaging balls 58, so that the first piston 10 can be prevented from moving up. After that, as shown in FIG. 2A, the second piston 20 further moves down with respect to the first piston 10, which is prevented from moving up or down.

As shown in FIG. 3, which is an enlarged view of a main part of FIG. 2A, the guide cylinder 6 has a relief groove 70 formed in a radially outer upper part of each of the supporting holes 56 provided in the cylindrical wall 6a (upper left part in FIG. 3). It is preferable that the angle θ of intersection between the straight line GM connecting the tip M of a corner 71 of the relief groove 70 with the center G of the engaging ball 58 and the straight line GN connecting the tip N of a corner 67 of the press portion 66 with the center G of the engaging ball 58 fall within a range of 10 to 30 degrees. The reason for this is as follows:

If the angle θ of intersection is smaller than 10 degrees, the force with which the press portion 66 pushes the engaging ball 58 radially inward becomes too weak; therefore, the force with which the press portion 66 pushes the engaging ball 58 into the cam groove 60 becomes too weak, with the result that the engaging ball 58 may no longer engage smoothly with the cam groove 60. If the angle θ of intersection is larger than 30 degrees, the force with which the press portion 66 pushes the engaging ball 58 radially inward becomes too strong; therefore the force with which the press portion 66 presses the engaging ball 56 toward the guide face 32 of the output rod 26 becomes too strong, with the result that the output rod 26 (and the second piston 20) may no longer smoothly move up or down and the guide face 32 may have its surface damaged. Therefore, it is preferable that the angle θ of intersection fall within a range of 10 to 30 degrees.

Second to fifth embodiments of the present invention are described below with reference to FIGS. 4, 5, 6A through 6D, and 7, respectively. In these embodiments, those components which are identical (or similar) to those of the first embodiment are described, in principle, with reference to the same reference numerals.

FIG. 4, which is similar to FIG. 2D, shows the second embodiment of the present invention. The second embodiment shows an example where the cylinder device 1 is provided with a link clamping mechanism for fixing a workpiece W. The second embodiment shown in FIG. 4 differs from the first embodiment in terms of the following points.

The housing 2 is attached to a fixed base T such as a table. The output rod 26 has an upper portion (i) projecting upward from the upper end wall 2a of the housing 2 and (ii) supporting a left end of a clamping member 77 via a first pin 76 so that the clamping member 77 is vertically rotatable. A link member 79 has an upper portion which is rotatably supported, via a second pin 78, by a crosswise intermediate portion of the clamping member 77. The link member 79 has a lower portion which is rotatably supported by a supporting portion 81 via a third pin 80. The supporting portion 81 projects upward from the upper end wall 2a.

In a case where the cylinder device 1 is subjected to lock driving, as shown in FIG. 4, compressed air in the lock chamber 40 first causes the second piston 20 to move up the output rod 26. This causes (i) the force multiplier 52 to be changed to an initial state of force multiplication driving and (ii) the clamping member 77 to be rapidly rotated clockwise. And, when a push bolt 82, provided at a right end of the clamping member 77, makes contact with an upper side of a workpiece W so that a high load acts on the output rod 26, the compressed air in the lock chamber 40 strongly pushes up the output rod 26 via the first piston 10 and the engaging balls 58. This causes the clamping member 77 to be strongly driven clockwise.

It should be noted that as explained above in the first embodiment, release driving of the cylinder device 1 is carried out by executing the steps of the procedure for lock driving in reverse order.

Further, as indicated by dashed-two dotted lines in FIG. 4, it is preferable that the cylinder device 1 have two separate annular cam members 86, 86 mounted in an outer circumferential part of the large-diameter portion 28 so as to be immovable vertically and rotatable around the axis and each of the cam members 86 be formed with such a cam face 62 as those described above and such a guide face 32 as that described above. Since the cam members 86, 86 are provided separately from the second piston 20, it is only necessary to treat only cam members 86 in hardening the cam faces 62 and the guide faces 32, and it is no longer necessary to treat the whole second piston 20. It should be noted that the cylinder device 1 may have three separate cam members 86 or a single annular entity instead of having two separate cam members 86 as exemplified above.

In a case where the separate cam members 86, 86 are applied to the first embodiment shown in FIG. 1, it is preferable that the cam members 86, 86 be supported on the guide cylinder 6 of the housing 2 via phase determining members (not illustrated) composed of pins and/or balls so as to be movable vertically and irrotatable around the axis. This allows the second piston 20 (and the output rod 26) to freely rotate on its axis with respect to the housing 2 and the cam members 86, 86. Therefore, even in a case where the second piston 20 receives excessive torque from any cause, the cam members 86 can be prevented from rotating. This makes it possible to prevent damage to the cam faces 62 and the guide faces 32 of the cam members 86.

The aforementioned separate cam members 86 can of course be applied to each of the embodiments described below.

Figure 5:
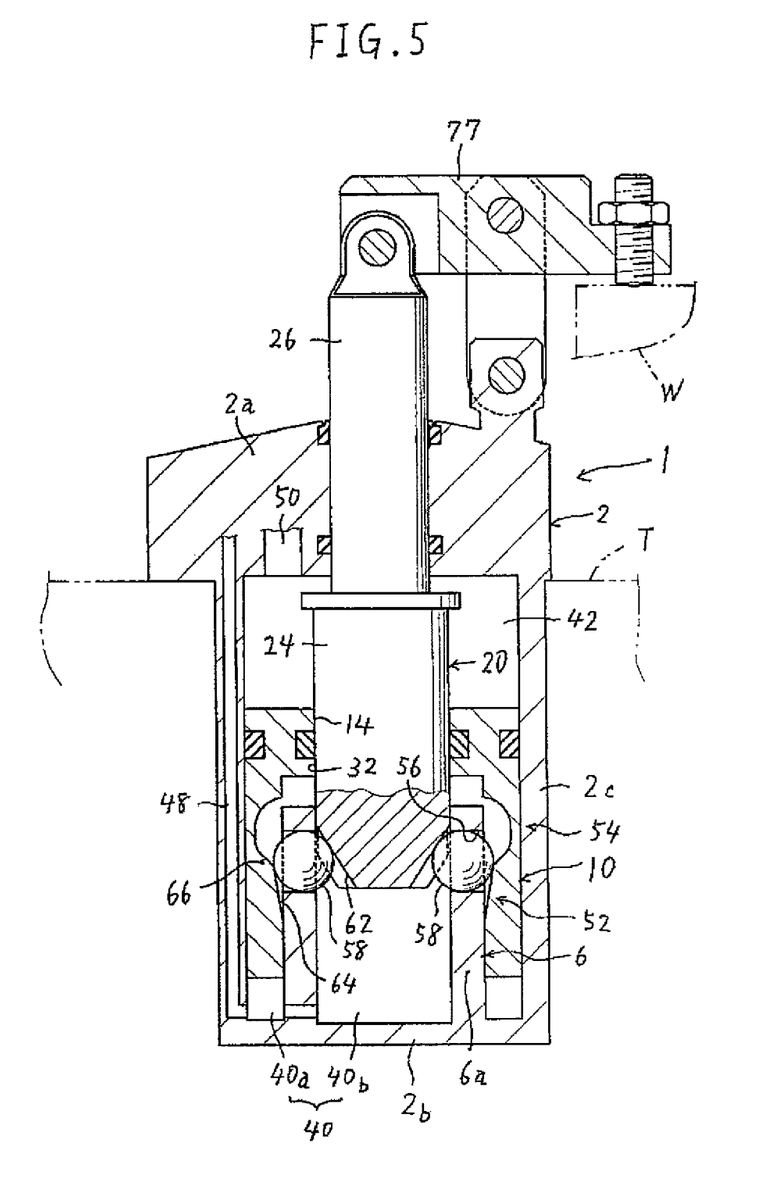
FIG. 5, which is similar to FIG. 4, shows a cylinder device according to a third embodiment of the present invention.

FIG. 5 shows the third embodiment of the present invention. From the second embodiment shown in FIG. 4, the third embodiment differs in terms of the following points.

The guide cylinder 6 projects upward (toward the upper end wall 2a) from the lower end wall 2b of the housing 2. The guide cylinder 6 has supporting holes 56 formed in an upper part thereof.

The plurality of cam faces 62 are provided in a lower part of the piston main body 24 of the second piston 20.

Further, the force-multiplying face 64 is provided at a certain height of the cylindrical hole 14 of the first piston 10.

Furthermore, in the third embodiment, the force multiplier 52 and the change-over mechanism 54 are arranged in the lock chamber 40.

Further, in the third embodiment, the retaining spring 47 in FIG. 4 is omitted. It should be noted that the retaining spring 47 may be omitted from the first embodiment shown in FIG. 1 or from any of the embodiments described below.

FIGS. 6A through 6D, which are similar to FIGS. 2A through 2D, respectively, show the fourth embodiment of the present invention. The fourth embodiment shows an example where the cylinder device 1 is provided with a swivel clamping mechanism for fixing an object to be fixed such as a workpiece.

First, a structure of the cylinder device 1 is described with reference to FIG. 6A (release state).

The piston main body 24 of the second piston 20 is inserted in the cylindrical hole 14 of the first piston 10 inserted in the housing 2, and the output rod 26 projects upward from the piston main body 24, with a lower rod part 88 projecting downward from the piston main body 24. The lock chamber 40 is formed above the first piston 10 and the second piston 20, and the release chamber 42 is formed below the first piston 10 and the second piston 20. The force multiplier 52 and the change-over mechanism 54 are provided in the release chamber 42.

That is, according to the fourth embodiment, the first piston 10, the second piston 20, the force multiplier 52, and the change-over mechanism 54 are provided upside down, as compared with those of the first embodiment.

The housing 2 has a lower end wall 2b in which a lower hole 90 is provided, and has an upper end wall 2a in which a through-hole 34 is provided. The output rod 26 has the lower rod part 88 so supported in the lower hole 90 as to be movable vertically and rotatable on the axis. The output rod 26 is so hermetically supported in the through-hole 34 as to be movable vertically and rotatable on its axis. The output rod 26 has a projecting portion projecting upward from the upper end wall 2a, with a clamping member 77 (see FIGS. 6B through 6D) attached to the projecting portion by a nut 89, the clamping member 77 being constituted by a cantilever arm.

A guide mechanism 92 is provided between the guide cylinder 6 and the lower rod part 88. The guide mechanism 92 is of a publicly known structure configured as follows (for example, see Japanese Patent Application Publication, Tokukai, No. 2004-1163 A):

The lower rod part 88 has a plurality of guide grooves 93 which (only one of which is illustrated here) are arranged at regular intervals circumferentially. Each of the guide grooves 93 is constituted by helical swivel grooves 93a and a straight groove 93b which are vertically concatenated so that the straight groove 93b is located above the helical swivel grooves 93a (see FIG. 6B). Guide balls 94 fitted in the respective guide grooves 93 are supported by the guide cylinder 6. A swivel mechanism is constituted by the guide balls 94 and the helical swivel grooves 93a.

Figure 6A:
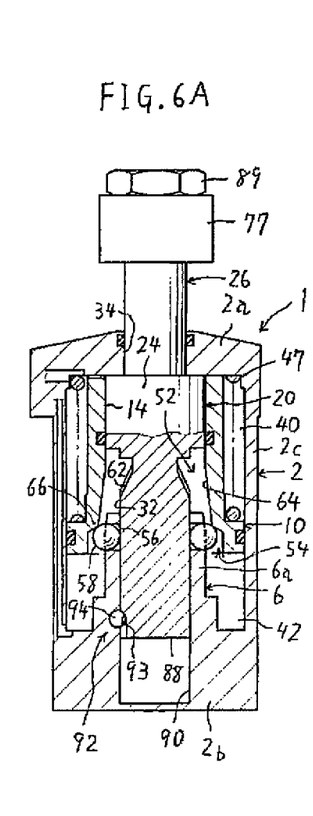
FIGS. 6A through 6D, which are similar to FIGS. 2A through 2D, respectively, show a fourth embodiment of the present invention.

The cylinder device 1 thus configured operates as follows:

In the release state shown in FIG. 6A, compressed air is discharged out of the lock chamber 40, and compressed air is supplied into the release chamber 42. This causes (i) the compressed air in the release chamber 42 to push the first piston 10 and the second piston 20 upward, and (ii) the clamping member 77 to be changed to a retreating state by swiveling. The first piston 10 can be received by the guide cylinder 6 of the housing 2 via the engaging balls 58 so as to be able to be prevented from moving downward.

In a case where the cylinder device 1 is subjected to lock driving, (i) the compressed air is discharged out of the release chamber 42 and (ii) compressed air is supplied into the lock chamber 40, in the release state shown in FIG. 6A.

Figure 6B:
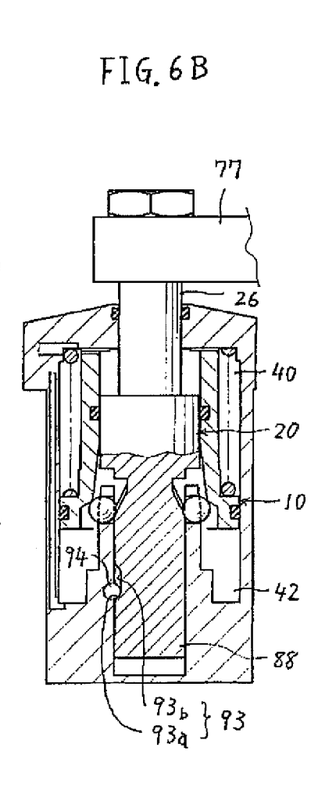

Then, the compressed air in the lock chamber 40 pushes the second piston 20 downward so as to cause the output rod 26 to move down with a low-load. In response thereto, as shown in FIG. 6B, the guide balls 94 cause the output rod 26 and the clamping member 77 to move down with a low load, while swiveling them via the helical grooves 93a.

Figure 6C:
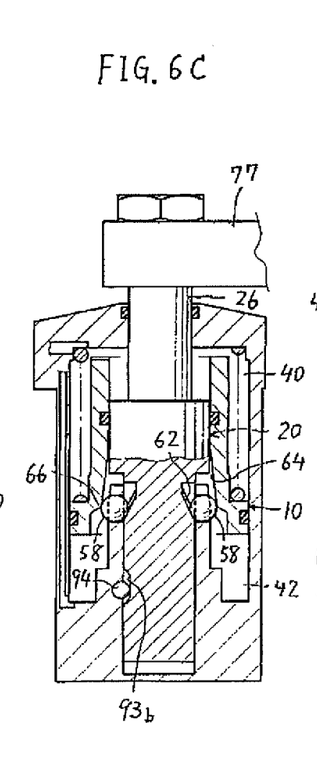

Next, as shown in FIG. 6C (initial state of force multiplication driving), the guide balls 94 causes the output rod 26 to move straight down, via the straight grooves 93b, with a low load. And, when a high load acts on the output rod 26 because a lower surface of a right portion of the clamping member 77 is received by a workpiece (not illustrated), a downward thrust of the first piston 10 pushes the engaging balls 58 radially inward. This causes the downward thrust of the first piston 10 to be subjected to a force-multiplying transformation via the force-multiplying face 64, the engaging balls 58, and the cam faces 62. In consequence, the output rod 26 is strongly driven downward.

Figure 6D:
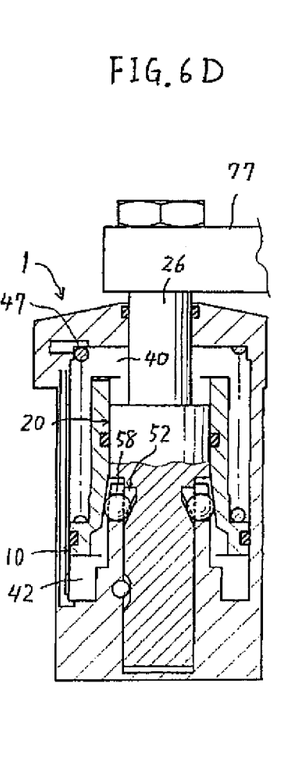

After that, as shown in FIG. 6D (locked state at a final stage of force multiplication driving), the first piston 10 strongly pushes the output rod 26 downward via the engaging balls 58 of the force multiplier 52. For this reason, a resultant of a downward force exerted by the force multiplier 52 and a downward force exerted by the second piston 20 causes the output rod 26 to strongly press the workpiece against a fixed base (not illustrated) such as table via the clamping member 77.

In a case where the cylinder device 1 is changed from the locked state shown in FIG. 6D to the release state shown in FIG. 6A, (i) the compressed air is discharged out of the lock chamber 40 and (ii) compressed air is supplied into the release chamber 42, in the state shown in FIG. 6D. This causes the cylinder device 1 to be changed to the release state by executing the steps of the procedure for lock driving in reverse order.

An angle of inclination of each of the cam faces 62 with respect to the axis of the output rod 26 preferably ranges from 30 degrees to 60 degrees. An angle of inclination of the force-multiplying face 64 with respect to the axis of the output rod 26 preferably ranges from 4 degrees to 15 degrees. These points also apply to each of the embodiments which are early described.

The fourth embodiment can be altered as follows:

The guide mechanism 92 is of course not limited to the exemplified structure. Instead of the exemplified guide balls 94, cylindrical pins, for example, can be employed as guide members to be fitted in the guide grooves 93.

The fourth embodiment can be configured so that (i) the lower rod part 88 has a lower portion projecting downward from the lower end wall 2b, (ii) the projecting portion is hermetically inserted in the lower end wall 2b, (iii) the projecting portion has its lower part coupled to a detected part via which an operating state of the cylinder device is detected by a sensor which faces the detected part. Examples of the sensor encompass a limit switch.

In the fourth embodiment, the guide grooves 93 and the guide balls 94 may be omitted so that the clamping member 77 is allowed to move only vertically.

Figure 7:
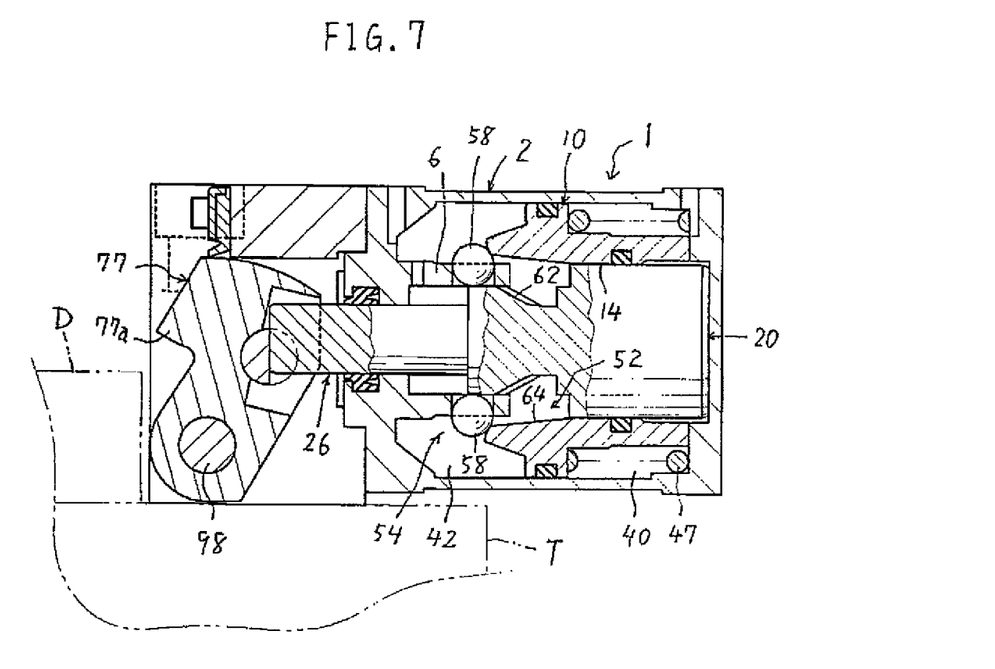
FIG. 7, which is similar to FIG. 2A, shows a cylinder device according to a fifth embodiment of the present invention.

FIG. 7, which is similar to FIG. 2A, shows a fifth embodiment of the present invention. The fifth embodiment shows an example where the cylinder device 1 is provided with a clamping mechanism for fixing a die D. The fifth embodiment shown in FIG. 7 differs from the first embodiment shown in FIG. 2A in terms of the following points.

In a right portion of the transversely-situated housing 2, a cylinder device 1 with a force multiplier similar to that shown in FIG. 2A is provided. Further, in a lower left portion of the housing 2, a clamping member 77 is swingably supported via a support pin 98. At a certain height of the swingable clamping member 77, the output rod 26 has its left end coupled so as to be able to be pushed and pulled horizontally.

In the release state shown in FIG. 7, the output rod 26 retreats rightward, and the clamping member 77 swings to retreat clockwise. When the output rod 26 advances leftward during lock driving, the clamping member 77 swings to advance counterclockwise, so that an output portion 77a of the clamping member 77 presses the die D.

Each of the embodiments can be altered as follows:

The output rod 26 may be configured in a straight shape, instead of being configured to be in a stepped shape including the large-diameter portion 28 and the small-diameter portion 30.

The number of the engaging balls 58 is preferably three or four, but can be alternatively two or not less than five.

The supporting holes 56, in which the engaging balls 58 are inserted, respectively, may be obliquely bored through the cylindrical wall 6a of the guide cylinder 6, instead of being horizontally bored through the cylindrical wall 6a of the guide cylinder 6.

A pressurized fluid to be used in the cylinder device of the present invention can be another pressurized gas or a liquid such as pressurized oil, instead of being pressurized air as exemplified above.

The cylinder device may be laid in a position with the exemplified top at the bottom and the exemplified bottom at the top. Alternatively, the cylinder device may be laid in a horizontal position or in an oblique position.

In addition, various alterations can of course be made within a range that a person skilled in the art can envisage.

REFERENCE SIGNS

2: Housing, 2a: Upper end wall, 2b: Lower end wall, 6: Guide cylinder, 6a: Cylindrical wall, 10: First piston, 14: Cylindrical hole, 20: Second piston, 24: Piston main body of the second piston 20, 26: Output rod, 32: Guide face, 40: Lock chamber, 42: Release chamber, 52: Force multiplier, 54: Change-over mechanism, 56: Supporting hole, 58: Engaging ball, 62: Cam face, 64: Force-multiplying face, 66: Press portion, 86: Cam member.

The invention claimed is:

1. A cylinder device, having a force multiplier, comprising:
    a first piston (10) inserted in a housing (2) so as to be hermetically movable axially, the first piston (10) having a cylindrical hole (14) bored therethrough axially;
    a second piston (20) inserted in the cylindrical hole (14) of the first piston (10) so as to be hermetically movable axially, the second piston (20) having an output rod (26) projecting outward from the housing (2);
    a lock chamber (40) and a release chamber (42), formed by using the first piston (10) and the second piston (20) to axially compartmentalize space in the housing (2), into and out of which a pressurized fluid is supplied and discharged;
    the force multiplier (52), which has engaging balls (58) and which causes (i) a first force, with which a pressurized fluid supplied into the lock chamber (40) pushes the first piston (10) toward the release chamber (42), to be transformed in a force-multiplying manner into a second force and (ii) the second force to be transmitted to the second piston (20); and
    a change-over mechanism (54) which selectively couples, via the engaging balls (58), the first piston (10) to the housing (2) or the second piston (20), the change-over mechanism (54) receivably coupling the first piston (10) to the housing (2) via the engaging balls (58) during a low-load stroke of the second piston (20) and drivably coupling the first piston (10) to the second piston (20) via the force multiplier (52) during a high-load stroke of the second piston (20).

2. The cylinder device having the force multiplier as set forth in claim 1, wherein when the second piston (20) has advanced toward the release chamber (42) by a predetermined low-load stroke with the first piston (10) receivably coupled to the housing (2), the change-over mechanism (54) decouples the first piston (10) from the housing (2) and drivably couples the first piston (10) to the second piston (20) via the force multiplier (52).

3. The cylinder device having the force multiplier as set forth in claim 1, wherein the housing (2) has two end walls (2a) and (2b) and a guide cylinder (6) projecting from one of the two end walls (2a, 2b) toward the other end wall (2b, 2a), and the second piston (20) has a guide face (32) formed on an outer circumference thereof and inserted in the guide cylinder (6),
    the force multiplier (52) comprising: supporting holes (56) formed in a cylindrical wall (6a) of the guide cylinder (6) at predetermined intervals circumferentially and bored through the cylindrical wall (6a) radially; engaging balls (58) put in the supporting holes (56), respectively; cam faces (62) formed on the outer circumference of the second piston (20) so that the engaging balls (58) engage with the cam faces (62), respectively, each of the cam faces (62) being formed to get closer to an axis of the second piston (20) as each of the cam faces (62) extends toward the lock chamber (40); and a force-multiplying face (64) formed in the cylindrical hole (14) of the first piston (10) and formed to get closer to the axis as it extends toward the lock chamber (40).

4. The cylinder device having the force multiplier as set forth in claim 3, wherein the first piston (10) is provided with a press portion (66) for pushing the engaging balls (58) radially inward at a start of force multiplication driving of the force multiplier (52), and for, during the low-load stroke of the second piston (20), pushing the engaging balls (58) radially inward and toward the guide face (32) of the second piston (20).

5. The cylinder device having the force multiplier as set forth in claim 4, wherein the change-over mechanism (54) is constituted by the press portion (66), the engaging balls (58), the guide face (32), and the cam faces (62), the change-over mechanism (54) being configured such that during the low-load stroke, the engaging balls (58), pushed out radially outward by the guide face (32), receive the press portion (66) on a side of the release chamber (42), whereby the second piston (20) moves up toward the release chamber (42), leaving behind the first piston (10), the change-over mechanism (54) being configured such that at the start of the force multiplication driving, the press portion (66) causes the engaging balls (58) to engage with the cam faces (62), respectively, whereby the force-multiplying face (64) of the first piston (10) drives the second piston (20) via the engaging balls (58) and the cam faces (62).

6. The cylinder device having the force multiplier as set forth in claim 1, wherein the cross-sectional area of the pressure receiving side of the second piston (20) is greater than the cross-sectional area of the output rod (26).

7. The cylinder device having the force multiplier as set forth in claim 3, wherein an outer diameter of the piston main body (24) of the second piston (20) takes on a greater value than an inner diameter of the guide cylinder (6).

8. The cylinder device having the force multiplier as set forth in any one of claims 1 to 5, wherein the output rod (26) projects outward from the housing (2) through the release chamber (42).

9. The cylinder device having the force multiplier as set forth in any one of claims 1 to 5, wherein the output rod (26) projects outward from the housing (2) through the lock chamber (40).

10. The cylinder device having the force multiplier as set forth in claim 3, further comprising a cam member (86) mounted in an outer circumferential part of the output rod (26), the cam member (86) being provided with the guide face (32) and the cam faces (62).

11. The cylinder device having the force multiplier as set forth in claim 10, wherein the cam member (86) is mounted on the output rod (26) so as to be rotatable around the axis and the cam member (86) is coupled to the guide cylinder (6) so as to be movable axially and irrotatable around the axis.

* * * * *